United States Patent
Shibata et al.

(10) Patent No.: US 9,140,465 B2
(45) Date of Patent: Sep. 22, 2015

(54) ELECTROLYSIS DEVICE AND HEAT-PUMP-TYPE WATER HEATER PROVIDED WITH SAME

(75) Inventors: Yutaka Shibata, Sakai (JP); Kaori Yoshida, Sakai (JP); Isao Fujinami, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 279 days.

(21) Appl. No.: 13/824,133

(22) PCT Filed: Sep. 28, 2011

(86) PCT No.: PCT/JP2011/005465
§ 371 (c)(1),
(2), (4) Date: Mar. 15, 2013

(87) PCT Pub. No.: WO2012/042868
PCT Pub. Date: Apr. 5, 2012

(65) Prior Publication Data
US 2013/0175160 A1    Jul. 11, 2013

(30) Foreign Application Priority Data
Sep. 30, 2010 (JP) .................................. 2010-220945

(51) Int. Cl.
| | |
|---|---|
| *F24H 9/00* | (2006.01) |
| *C02F 1/461* | (2006.01) |
| *F24D 19/00* | (2006.01) |
| *C02F 1/46* | (2006.01) |
| C25B 9/00 | (2006.01) |
| F24H 4/04 | (2006.01) |
| F24D 17/02 | (2006.01) |

(52) U.S. Cl.
CPC ............ *F24H 9/0047* (2013.01); *C02F 1/4602* (2013.01); *C02F 1/46104* (2013.01); *F24D 19/0092* (2013.01); *F24H 9/0015* (2013.01); *C02F 2201/4611* (2013.01); *C02F 2201/46135* (2013.01); *C02F 2209/005* (2013.01); *C02F 2301/028* (2013.01); *C25B 9/00* (2013.01); *F24D 17/02* (2013.01); *F24H 4/04* (2013.01)

(58) Field of Classification Search
None
See application file for complete search history.

(56) References Cited

U.S. PATENT DOCUMENTS

| | | | | |
|---|---|---|---|---|
| 3,652,433 | A | * | 3/1972 | Thompson ..................... 205/758 |
| 4,048,030 | A | * | 9/1977 | Miller ........................... 205/701 |
| 2008/0115925 | A1 | | 5/2008 | Tanaka et al. |

(Continued)

FOREIGN PATENT DOCUMENTS

| | | |
|---|---|---|
| JP | 10-174975 A | 6/1998 |
| JP | 2005-46809 A | 2/2005 |

(Continued)

OTHER PUBLICATIONS

International Search Report Issued in PCT/JP2011/005465, dated Nov. 15, 2011.

*Primary Examiner* — Harry D Wilkins, III
(74) *Attorney, Agent, or Firm* — Birch, Stewart, Kolasch & Birch, LLP

(57) ABSTRACT

An electrolysis device is configured such that water flowing into a container from an inlet flows from an upstream side to a downstream side in the container and flows out from an outlet. A first electrode pair is arranged on the upstream side than a second electrode pair. In the electrolysis device, in order to suppress a decrease in current density due to electrolyte concentration in the water in the second electrode pair arranged on the downstream side than the first electrode pair, the current density in the second electrode pair is adjusted.

9 Claims, 9 Drawing Sheets

(56) References Cited

U.S. PATENT DOCUMENTS

2010/0132414 A1* 6/2010 Song et al. .................. 68/13 A
2011/0061418 A1* 3/2011 Ishihara et al. .............. 62/324.3

FOREIGN PATENT DOCUMENTS

| JP | 2010-91122 A | 4/2010 |
| WO | WO 2006/027825 A1 | 3/2006 |

* cited by examiner

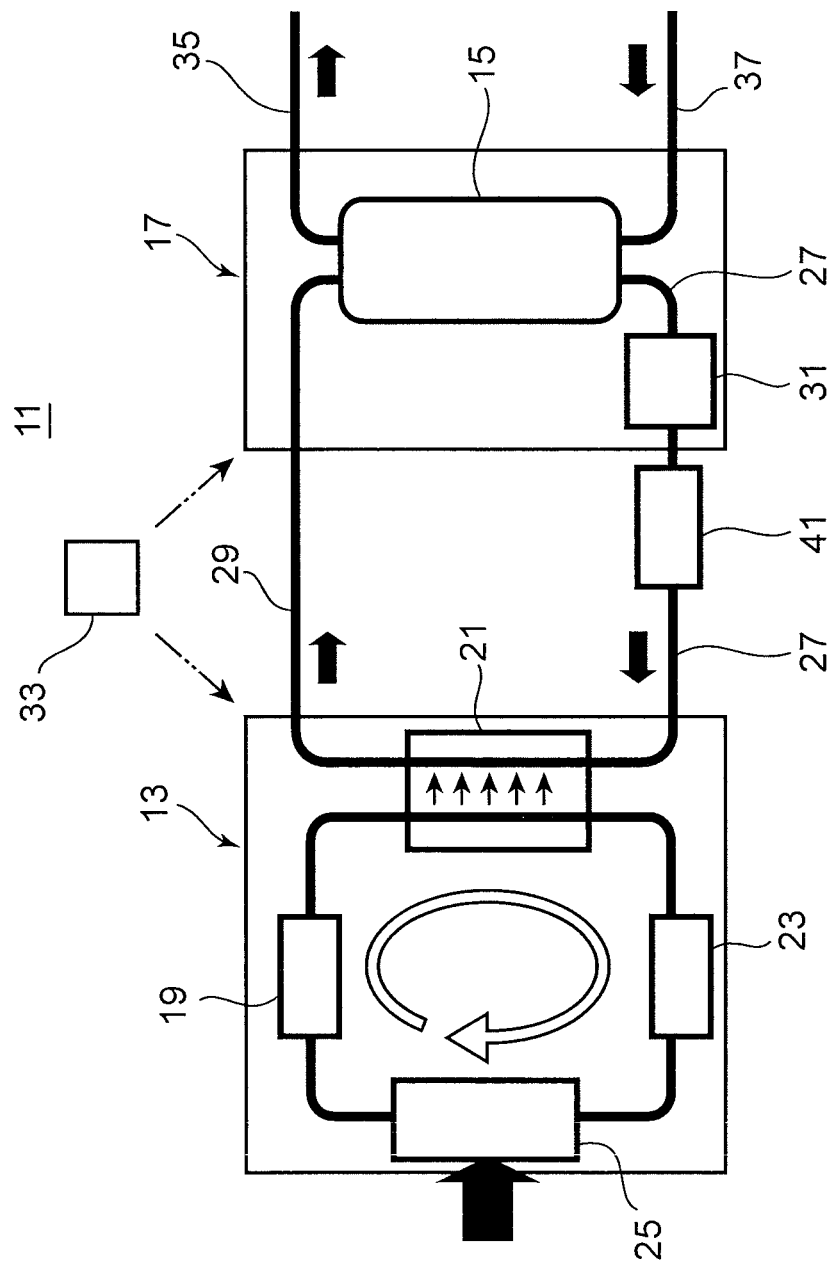

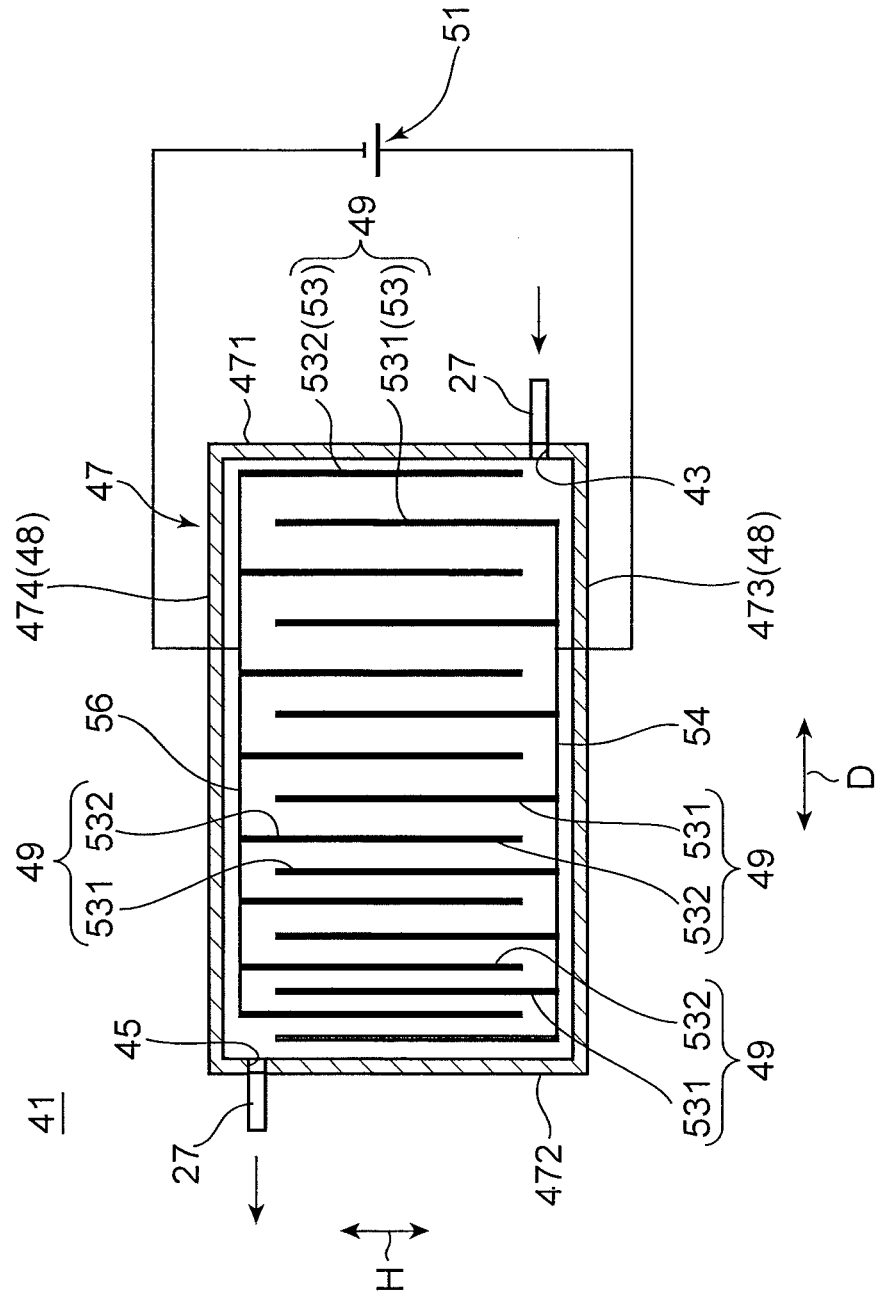

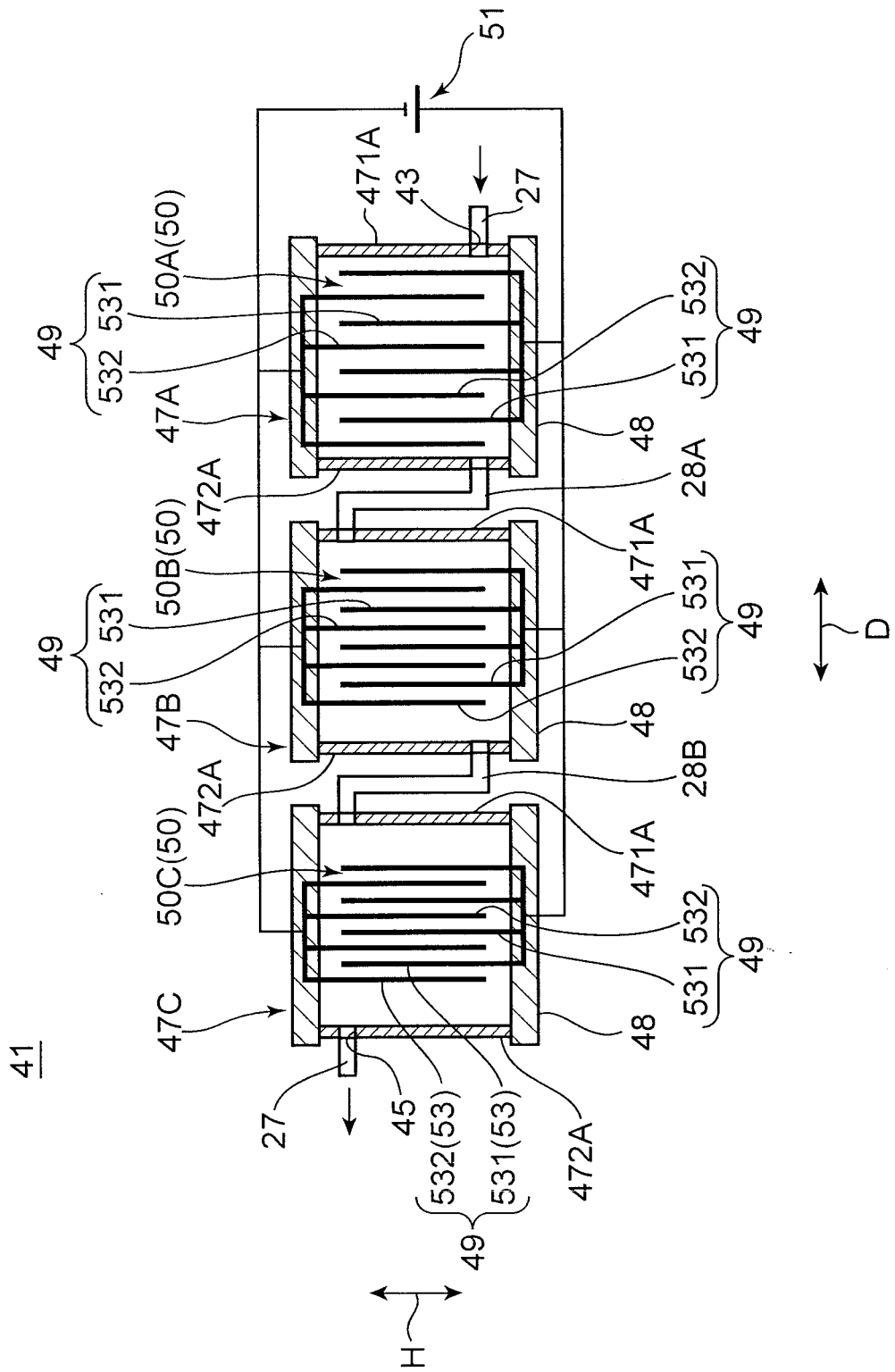

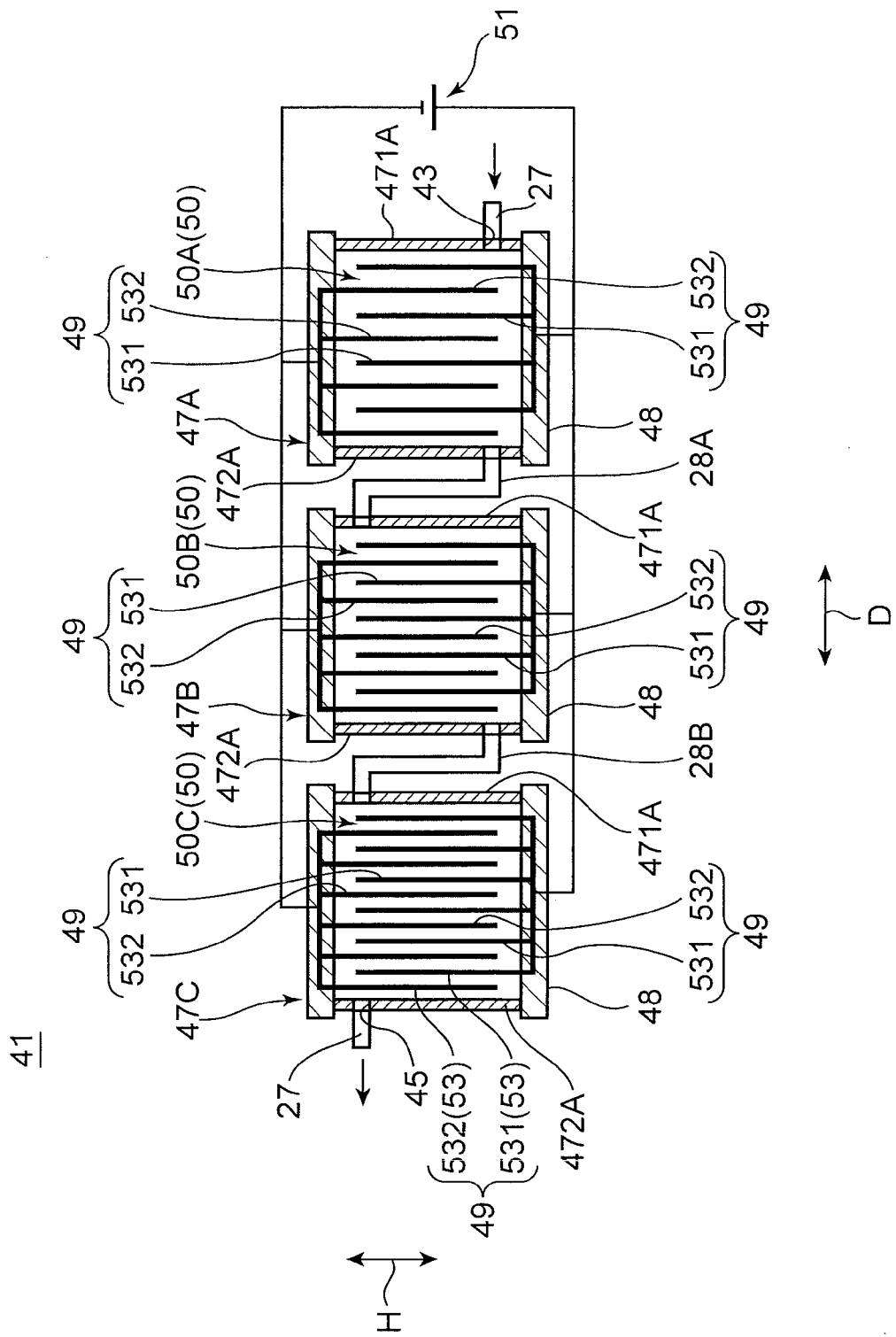

ELECTROLYSIS DEVICE AND HEAT-PUMP-TYPE WATER HEATER PROVIDED WITH SAME

TECHNICAL FIELD

The present invention relates to an electrolysis device for removing, in a water heater such as a heat-pump-type water heater, scale components in water, and to a heat-pump-type water heater provided with the electrolysis device.

BACKGROUND ART

In general, a heat-pump-type water heater includes a refrigerant circuit in which a compressor, a water heat exchanger, an expansion valve, and an air heat exchanger are connected by pipes in this order; and a hot water storage circuit including a tank in which water is stored, an inflow water pipe for feeding the water in the tank to the water heat exchanger, and an outflow hot water pipe for returning the water heated by the water heat exchanger to the tank. In the heat-pump-type water heater, usually, a water supply source of the water stored in the tank is tap water, well water, or the like.

Incidentally, the tap water or the well water contains components such as calcium ion, magnesium ion, and the like that cause scale (hereinafter referred to as scale components). Therefore, in a water heater, scale of calcium salt, magnesium salt, and the like is precipitated. In particular, underground water such as the well water has high concentration of the scale components compared with the tap water and has water quality that tends to cause scale. In the water heat exchanger, since the temperature of the water is high, scale is more likely to be precipitated than in other regions. When scale is precipitated and deposited on the inner surface of a pipe of the water heat exchanger, a problem occurs in that, for example, the heat transfer performance of the water heat exchanger is deteriorated or a channel of the pipe is narrowed.

For example, Patent Document 1 proposes a cooling water circulating apparatus including an electrolysis device in which one electrode pair is set in an electrolytic cell. Patent Document 1 describes that, since scale components can be removed from cooling water through electrolysis, it is possible to reduce adhesion of scale in a circulating path.

However, in the electrolysis device disclosed in Patent Document 1, removal efficiency for scale components in water is not necessarily sufficient.

Patent Document 1: WO2006/027825

SUMMARY OF THE INVENTION

Therefore, the present invention has been devised in view of such a point and it is an object of the present invention to provide an electrolysis device that can improve removal efficiency for scale components and a heat-pump-type water heater provided with the electrolysis device.

The electrolysis device according to the present invention is used in a water heater including a water heat exchanger (21) for heating water. The electrolysis device includes a container (47) including an inlet and an outlet for water, a first electrode pair (49) and a second electrode pair (49) disposed in the container (47), and a power supply (51) that applies a voltage to each of the electrode pairs (49). The electrolysis device is configured such that water flowing into the container (47) from the inlet flows from an upstream side to a downstream side in the container (47) and flows out from the outlet. The first electrode pair (49) is arranged on the upstream side than the second electrode pair (49). In the electrolysis device, in order to suppress a decrease in current density due to electrolyte concentration in the water in the second electrode pair (49) arranged on the downstream side than the first electrode pair (49), the current density in the second electrode pair (49) is adjusted.

BRIEF DESCRIPTION OF THE DRAWINGS

FIG. 1 is a configuration diagram showing a heat-pump-type water heater according to an embodiment of the present invention.

FIG. 7 is a sectional view showing an electrolysis device according to a sixth embodiment of the present invention.

FIG. 8 is a sectional view showing an electrolysis device according to a seventh embodiment of the present invention.

FIG. 9 is a sectional view showing an electrolysis device according to an eighth embodiment of the present invention.

DESCRIPTION OF EMBODIMENTS

Figure 2A:
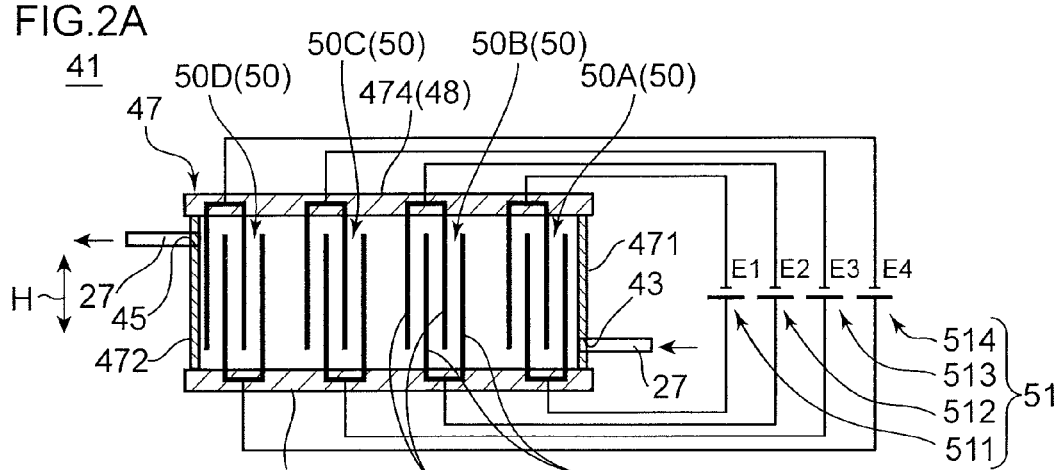
FIG. 2A is a sectional view showing an electrolysis device according to a first embodiment of the present invention and is a diagram of the electrolysis device viewed from a side.

Embodiments of the present invention are explained in detail below with reference to the drawings.

<Heat-Pump-Type Water Heater>

As shown in FIG. 1, a heat-pump-type water heater 11 according to an embodiment includes a heat pump unit 13 in which a refrigerant circulates, a hot water storage unit 17 that exchanges heat with the refrigerant in the heat pump unit 13 to heat up low-temperature water and stores high-temperature water in a tank 15, a water supply pipe 37, a hot water supply pipe 35, an electrolysis device 41, and a control unit 33. The water heater 11 according to this embodiment is a one-through type water heater that does not return hot water, which is supplied from the hot water supply pipe 35, to the tank 15.

The heat pump unit 13 includes a compressor 19, a water heat exchanger 21, an electric expansion valve 23, an air heat exchanger 25, and pipes that connect the foregoing. In this embodiment, carbon dioxide is used as the refrigerant circulating in the heat pump unit 13. The refrigerant exchanges, in the water heat exchanger 21, heat with the water circulating in the hot water storage unit 17 to heat the water and exchanges, in the air heat exchanger 25, heat with the outside air to absorb heat from the outside air.

The hot water storage unit 17 includes the tank 15 in which water is stored, an inflow water pipe 27 for feeding the water in the tank 15 to the water heat exchanger 21, and an outflow hot water pipe 29 for returning the water heated by heat exchange with the water heat exchanger 21 to the tank 15. A pump 31 is provided in the inflow water pipe 27. The pump 31 feeds the water flowing into the inflow water pipe 27 from a lower part of the tank 15 to the water heat exchanger 21 and further feeds the water to an upper part of the tank 15 through the outflow hot water pipe 29.

The electrolysis device 41 is provided in the inflow water pipe 27 and located between the pump 31 and the water heat exchanger 21. Details of the electrolysis device 41 are explained below.

The hot water supply pipe 35 is connected to the upper part of the tank 15. The hot water supply pipe 35 is a pipe for extracting high-temperature water stored in the tank 15 and supplying the high-temperature water to a bathtub or the like. The water supply pipe 37 is connected to the bottom of the tank 15. The water supply pipe 37 is a pipe for supplying low-temperature water into the tank 15 from a water supply source. As the water supply source for supplying water to the tank 15, for example, tap water or underground water such as well water can be used.

The control unit 33 is configured by, for example, a central processing unit (CPU), a memory in which data such as a program is stored, and a memory for storing data during program execution, various setting values, measured data, and the like. The control unit 33 controls the heat pump unit 13 and the hot water storage unit 17 on the basis of temperature data and the like measured by not-shown temperature sensors provided in the tank 15, the water heat exchanger 21, the pipes, and the like.

The operation of the water heater 11 is explained. In a heat-up operation for heating up water in the tank 15, the control unit 33 drives the compressor 19 of the heat pump unit 13, adjusts an opening degree of the electric expansion valve 23, and drives the pump 31 of the hot water storage unit 17. Consequently, as shown in FIG. 1, low-temperature water in the tank 15 is fed from an outflow water port provide in the bottom of the tank 15 to the water heat exchanger 21 through the inflow water pipe 27 and heated in the water heat exchanger 21. Heated high-temperature water is returned into the tank 15 from an inflow water port provided in the upper part of the tank 15 through the outflow hot water pipe 29. Consequently, the high-temperature water is stored in the tank 15 from the top of the tank 15 in order.

The heat-pump-type water heater 11 according to this embodiment is a one-through type water heater. In the one-through type water heater 11, water (hot water) supplied from the hot water supply pipe 35 is used by a user and is not returned to the tank 15. Therefore, water of substantially the same amount as an amount of water supplied from the tank 15 through the hot water supply pipe 35 is supplied from the water supply source to the tank 15 through the water supply pipe 37. That is, water containing scale components is frequently supplied to the tank 15 from the water supply source such as the tap water or the well water. An amount of the supplied water is large. Therefore, in the case of the one-through heat-pump-type water heater, it is necessary to efficiently remove the scale components compare with the cooling water circulating apparatus of a circulation type and a water heater of a circulation type.

<Electrolysis Device>

(First Embodiment)

Figure 2B:
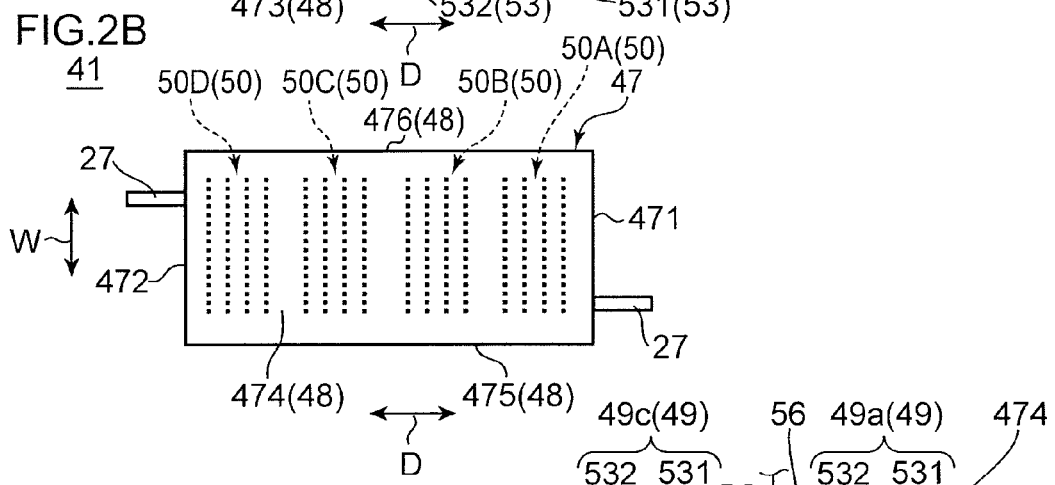
FIG. 2B is a plan view of the electrolysis device.

FIG. 2A is a sectional view showing the electrolysis device 41 according to a first embodiment of the present invention used in the water heater 11. FIG. 2A is a diagram of the electrolysis device 41 viewed from a side. FIG. 2B is a plan view of the electrolysis device 41. As shown in FIGS. 2A and 2B, the electrolysis device 41 according to the first embodiment includes a container 47, a plurality of electrode pairs 49, and power supplies 51.

The container 47 has a substantially rectangular parallelepiped shape. The container 47 includes a first wall 471 located on an upstream side of a flow of water and a second wall 472 located on a downstream side and a sidewall 48 that connects the walls 471 and 472. The first wall 471 and the second wall 472 are opposed to each other via a plurality of electrode plates 53 explained below in a direction in which the sidewall 48 extends (an array direction D of the plurality of electrode plates 53).

The sidewall 48 includes a third wall 473 and a fourth wall 474 shown in FIG. 2A and a fifth wall 475 and a sixth wall 476 shown in FIG. 2B. Arrangement in using the electrolysis device 41 can be set in a posture shown in FIG. 2A such that, for example, the third wall 473 is located below and the fourth wall 474 is located above. However, the arrangement is not limited to this. For example, the electrolysis device 41 may be arranged such that the longitudinal direction thereof faces the up down direction or may be arranged in other ways.

The third wall 473 and the fourth wall 474 are opposed to each other in a height direction H (the up down direction) via the plurality of electrode plates 53. Similarly, the fifth wall 475 and the sixth wall 476 are opposed to each other in a width direction W (the horizontal direction perpendicular to the array direction D) via the plurality of electrode plates 53.

The first wall 471 includes a first flow port 43 functioning as an outlet and inlet for water. The second wall 472 includes a second flow port 45 functioning as an outlet and inlet for water. In this embodiment, the first flow port 43 functions as an inlet and the second flow port 45 functions as an outlet. Inflow water pipes 27 are respectively connected to the first flow port 43 and the second flow port 45.

The first flow port 43 is provided in a position closer to the third wall 473 than the fourth wall 474 and closer to the fifth wall 475 than the sixth wall 476 in the first wall 471. The second flow port 45 is provided in a position closer to the fourth wall 474 than the third wall 473 and closer to the sixth wall 476 than the fifth wall 475 in the second wall 472. Specifically, the first flow port 43 and the second flow port 45 are respectively provided in the vicinities of opposite angles in the container 47 having a rectangular parallelepiped shape.

The container 47 has an elongated shape. A distance between the outer surface of the first wall 471 and the outer surface of the second wall 472 is larger than a distance between the outer surface of the third wall 473 and the outer surface of the fourth wall 474 and a distance between the outer surface of the fifth wall 475 and the outer surface of the sixth wall 476.

The plurality of electrode pairs 49 are disposed in the container 47. The plurality of electrode pairs 49 are arrayed along the longitudinal direction of the container 47. Each of the electrode pairs 49 is configured by a pair of electrode plates 53 (a first electrode plate 531 and a second electrode plate 532). Therefore, the plurality of electrode pairs 49 are configured by a plurality of electrode plates 53. Each of the electrode plates 53 has a substantially rectangular shape. Examples of the material of the electrode plate 53 include titanium, platinum, nickel, carbon, graphite, copper, and vitreous carbon.

The plurality of electrode plates 53 are arrayed in the thickness direction of the electrode plates 53 while being spaced apart from one another. Each of the electrode plates is arranged in a posture extending in a direction substantially perpendicular to the array direction D. The array direction D generally coincides with the direction in which the sidewall 48 extends (the longitudinal direction of the container 47). Spaces among the electrode plates 53 of each of the electrode pairs 49 are substantially the same.

The plurality of electrode plates 53 include a plurality of first electrode plates 531 connected to positive electrodes of the power supplies 51 and a plurality of second electrode plates 532 connected to negative electrodes of the power supplies 51. In the first embodiment, the first electrode plates 53 function as anodes and the second electrode plates 532 function as cathodes. The first electrode plates 531 and the second electrode plates 532 are alternately arranged along the array direction D of the plurality of electrode plates 53.

The plurality of electrode pairs 49 are divided into four blocks 50. The four blocks 50 include a block 50A arranged most upstream, a block 50B arranged on the downstream side of the block 50A, a block 50C arranged on the downstream side of the block 50B, and a block 50D arranged on the downstream side of the block 50C. The blocks 50 are arranged along the longitudinal direction of the container 47 (the array direction D). The plurality of first electrode plates 531 in each of the blocks are connected in parallel to the power supplies 51 corresponding thereto. The plurality of second electrode plates 532 in each of the blocks are connected in parallel to the power supplies 51 corresponding thereto.

Figure 2C:
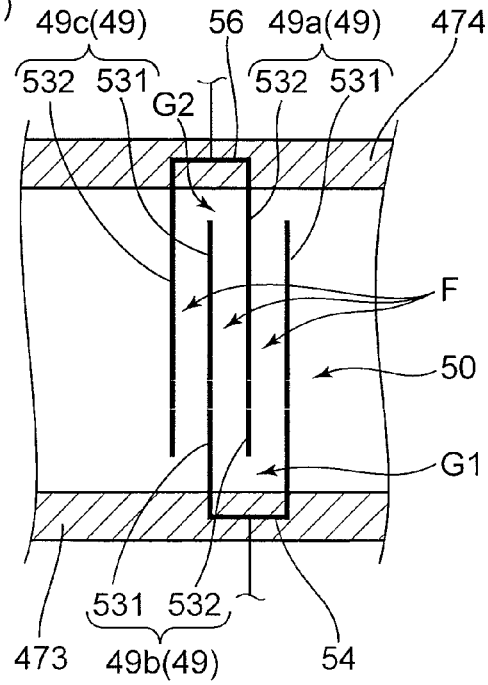
FIG. 2C is a partially-enlarged sectional view of FIG. 2A.

FIG. 2C is an enlarged sectional view of one block 50 shown in FIG. 2A. The four blocks 50A to 50D have substantially the same configurations. As shown in FIG. 2C, each of the blocks 50 includes three electrode pairs 49 configured by four electrode plates 53. The three electrode pairs 49 include an electrode pair 49a, an electrode pair 49b, and an electrode pair 49c. The three electrode pairs 49 are connected to the power supply 51 in parallel.

The electrode pair 49a is configured by the first electrode plate 531 located most upstream and the second electrode plate 532, which is a second electrode plate from the most upstream side. The electrode pair 49b is configured by the second electrode plate 532, which is the second electrode from the most upstream side, and the first electrode plate 531, which is a third electrode plate from the most upstream side. The electrode pair 49c is configured by the first electrode plate 531, which is the third electrode plate from the most upstream side, and the second electrode plate 532, which is a fourth electrode plate from the most upstream side.

The two first electrode plates 531 in each of the blocks 50 are respectively extended from a proximal end portions located in the third wall 473 toward the fourth wall 474. The proximal end portion of each of the first electrode plates 531 is coupled to a coupling plate 54 (or a coupling wire 54) extended in a direction substantially parallel to the third wall 473. The coupling plate 54 is connected to the positive electrode of the power supply 51. The coupling plate 54 is embedded in the third wall 473.

A gap G1 through which water can pass is provided between the distal end portion (the end portion on the fourth wall 474 side) of each of the first electrode plates 531 and the inner surface of the fourth wall 474.

The two second electrode plates 532 in each of the blocks 50 are respectively extended from the proximal end portions located in the fourth wall 474 toward the third wall 473. The proximal end portion of each of the second electrode plates 532 is coupled to a coupling plate 56 (or a coupling wire 56) extended in a direction substantially parallel to the fourth wall 474. The coupling plate 56 is connected to the negative electrode of the power supply 51. The coupling plate 56 is embedded in the fourth wall 474.

A gap G2 through which water can pass is provided between the distal end portion (the end portion on the third wall 473 side) of each of the second electrode plates 532 and the inner surface of the third wall 473. A gap between the electrode plate 53 in each of the electrode pairs 49 functions as a channel (a water channel) F through which water flows.

As shown in FIG. 2A, the electrolysis device 41 according to the first embodiment includes four power supplies 51 (power supplies 511 to 514) connected to the respective blocks 50. A voltage E2 applied to each of the electrode pairs 49 (the second electrode pairs) of a block B is larger than a voltage E1 applied to each of the electrode pairs 49 (the first electrode pairs) of a block A. A voltage E3 applied to each of the electrode pairs 49 (the third electrode pairs) of a block C is larger than the voltage E2 applied to each of the electrode pairs 49 of the block B. A voltage E4 applied to each of the electrode pairs 49 (the fourth electrode pairs) of the block D is larger than the voltage E3 applied to each of the electrode pairs 49 of the block C (E1<E2<E3<E4).

In the electrolysis device 41 having the structure explained above, water flowing into the container 47 from the first flow port 43 flows out to the outside of the container 47 from the second flow port 45 roughly through a path explained below. That is, the water flowing into the container 47 is subjected to electrolysis when passing between the electrode plates (the water channel F) of each of the electrode pairs 49 in the block A. The water passed through the block A flows further to the downstream side in order of the block B, the block C, and the block D. The water is subjected to electrolysis in the block B, the block C, and the block D in the same manner. The water passed through the block D flows out to the outside of the container 47 from the second flow port 45.

Until the water flowing into the container 47 from the first flow port 43 flows out to the outside of the container 47 from the second flow port 45, scale is precipitated on the second electrode plate 532, which is the cathode of each of the electrode pairs 49, by the electrolysis. The scale adhering to the second electrode plate 532 is removed from the inside of the electrolysis device 41 by, for example, periodically cleaning the second electrode plate 532. Further, the scale adhering to the cathode can be removed from the cathode by, for example, periodically inverting the polarity of the electrode plate 53.

In the cathode during the electrolysis, a reaction occurs in which hydrogen ions and electrons react with each other to generate hydrogen ($2H^+ + 2e^- \rightarrow H_2$) and pH around the cathode rises. On the other hand, in the anode during the electrolysis, a reaction occurs in which water and oxygen are generated from hydroxide ions ($4OH^- \rightarrow 2H_2O + O_2 + 4e^-$) and pH around the anode falls.

(Second Embodiment)

Figure 3:
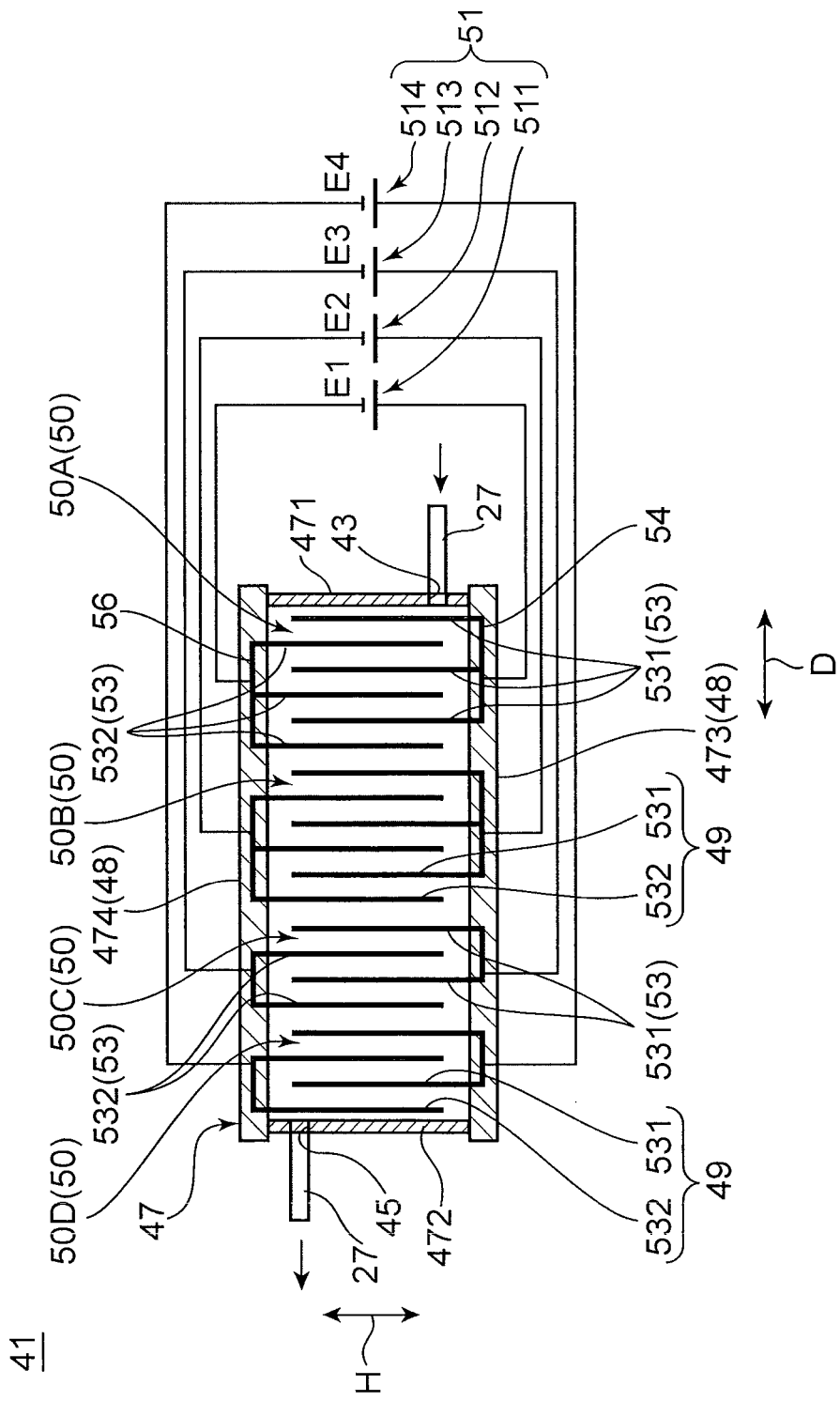
FIG. 3 is a sectional view showing an electrolysis device according to a second embodiment of the present invention.

FIG. 3 is a sectional view showing the electrolysis device 41 according to a second embodiment of the present invention. The electrolysis device 41 according to the second embodiment is different from the electrolysis device 41 according to the first embodiment in that the number of the electrode pairs 49 configuring the block C and the block D is smaller than the number of the electrode pairs 49 configuring the block A and the block B. In the second embodiment, components same as the components in the first embodiment are denoted by reference numerals and signs same as the reference numerals and signs in the first embodiment and detailed explanation of the components is omitted.

As shown in FIG. 3, in the second embodiment, each of the block 50A and the block 50B includes five electrode pairs 49 configured by six electrode plates 53. The five electrode pairs 49 are connected to the power supply 51 in parallel. Each of the block 50C and block 50D arranged on the downstream side than the block 50A and the block 50B includes three electrode pairs 49 configured by four electrode plates 53. The three electrode pairs 49 are connected to the power supply 51 in parallel. Spaces among the electrode plates 53 of each of the electrode pairs 49 are substantially the same.

As in the first embodiment, the electrolysis device 41 according to the second embodiment includes the four power supplies 51 (the power supplies 511 to 514) connected to the respective blocks 50. In the second embodiment, the voltages of the four power supplies 51 can be set, for example, the same as the voltages in the first embodiment (E1<E2<E3<E4). In the second embodiment, since the number of the electrode pairs 49 of the block 50C and the block 50D on the downstream side is set smaller than the number of the electrode pairs 49 of the block 50A and the block 50B on the upstream side, for example, all the voltages of the four power supplies 51 can be set to the same voltage (E1=E2=E3=E4).

In the second embodiment, a decrease in current density of the block 50 on the downstream side is suppressed by setting a voltage applied to the block 50 on the downstream side larger than a voltage applied to the block 50 on the upstream side. Further, in the second embodiment, the number of the electrode pairs 49 of the blocks 50C and 50D located on the downstream side is set small compare with the number of the electrode pairs 49 of the blocks 50A and 50B located on the upstream side. Compared with the case in which the number of the electrode pairs 49 of the blocks 50C and 50D is the same as the number (five) of the electrode pairs 49 of the blocks 50A and 50B, in the second embodiment, it is possible to increase current density per one electrode pair 49 in the blocks 50C and 50D.

(Third Embodiment)

Figure 4:
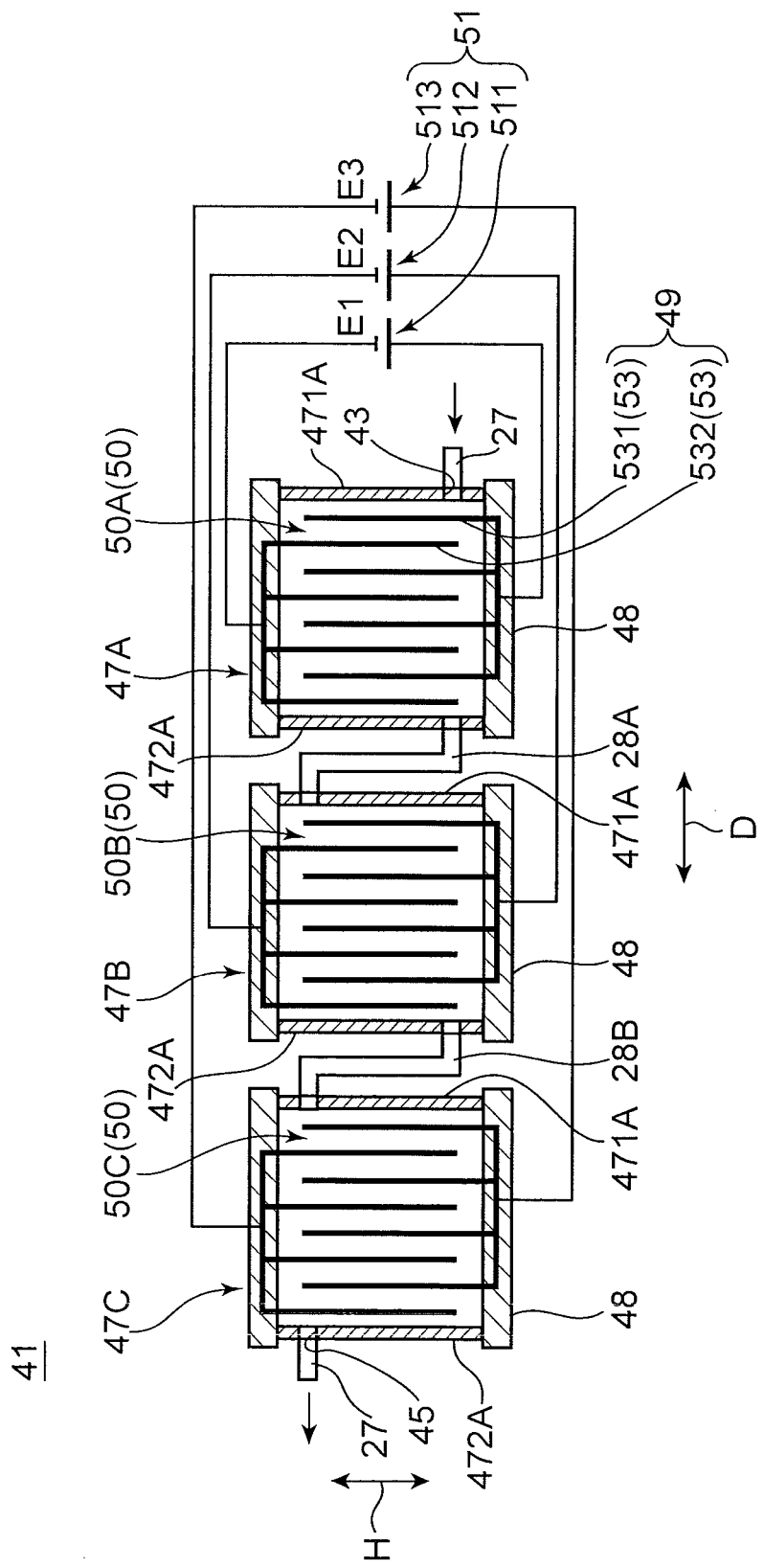
FIG. 4 is a sectional view showing an electrolysis device according to a third embodiment of the present invention.

FIG. 4 is a sectional view showing the electrolysis device 41 according to a third embodiment of the present invention. In the third embodiment, the container 47 includes a first housing 47A for housing the block 50A, a second housing 47B for housing the block 50B, a third housing 47C for housing the block 50C, a coupling pipe 28A for coupling the housing 47A and the housing 47B, and a coupling pipe 28B for coupling the housing 47B and the housing 47C. The first housing 47A, the second housing 47B, and the third housing 47C are coupled in series in this order by the coupling pipe 28A and the coupling pipe 28B.

The first housing 47A has a substantially rectangular parallelepiped shape. The first housing 47A includes a first wall 471A located on the upstream side of a flow of water and a second wall 472A located on the downstream side and the sidewall 48 that connects the walls 471A and 472B. The first wall 471A and the second wall 472A are opposed to each other via the plurality of electrode plates 53 in the direction in which the sidewall 48 extends (the array direction D). The second housing 47B and the third housing 47C have structure same as the structure of the first housing 47A. Therefore, components of the second housing 47B and the third housing 47C are denoted by the same reference numerals and signs and explanation of the components is omitted.

In the first wall 471A of the first housing 47A, a first flow port 43 functioning as an inlet for water is provided in the vicinity of the lower end of the first wall 471A. The inflow water pipe 27 on the upstream side is connected to the first flow port 43. In the second wall 472 of the third housing 47C, the second flow port 45 functioning as an outlet for water is provided in the vicinity of the upper end of the second wall 472A. The inflow water pipe 27 on the downstream side is connected to the second flow port 45.

The upstream side end portion of the coupling pipe 28A is connected to the vicinity of the lower end of the second wall 472A of the first housing 47A. The downstream side end portion of the coupling pipe 28A is connected to the vicinity of the upper end of the first wall 471A of the second housing 47B. The upstream side end portion of the coupling pipe 28B is connected to the vicinity of the lower end of the first wall 471A of the second housing 47B. The downstream side end portion of the coupling pipe 28B is connected to the vicinity of the upper end of the first wall 471A of the third housing 47C.

Each of the blocks 50 includes seven electrode pairs 49 configured by eight electrode plates 53. The electrode pairs 49 are connected to the power supply 51 in parallel. The electrolysis device 41 according to the third embodiment includes three power supplies 51 (power supplies 511 to 513) connected to the respective blocks 50 (E1<E2<E3). Spaces among the electrode plates 53 of each of the electrode pairs 49 are substantially the same.

(Fourth Embodiment)

Figure 5:
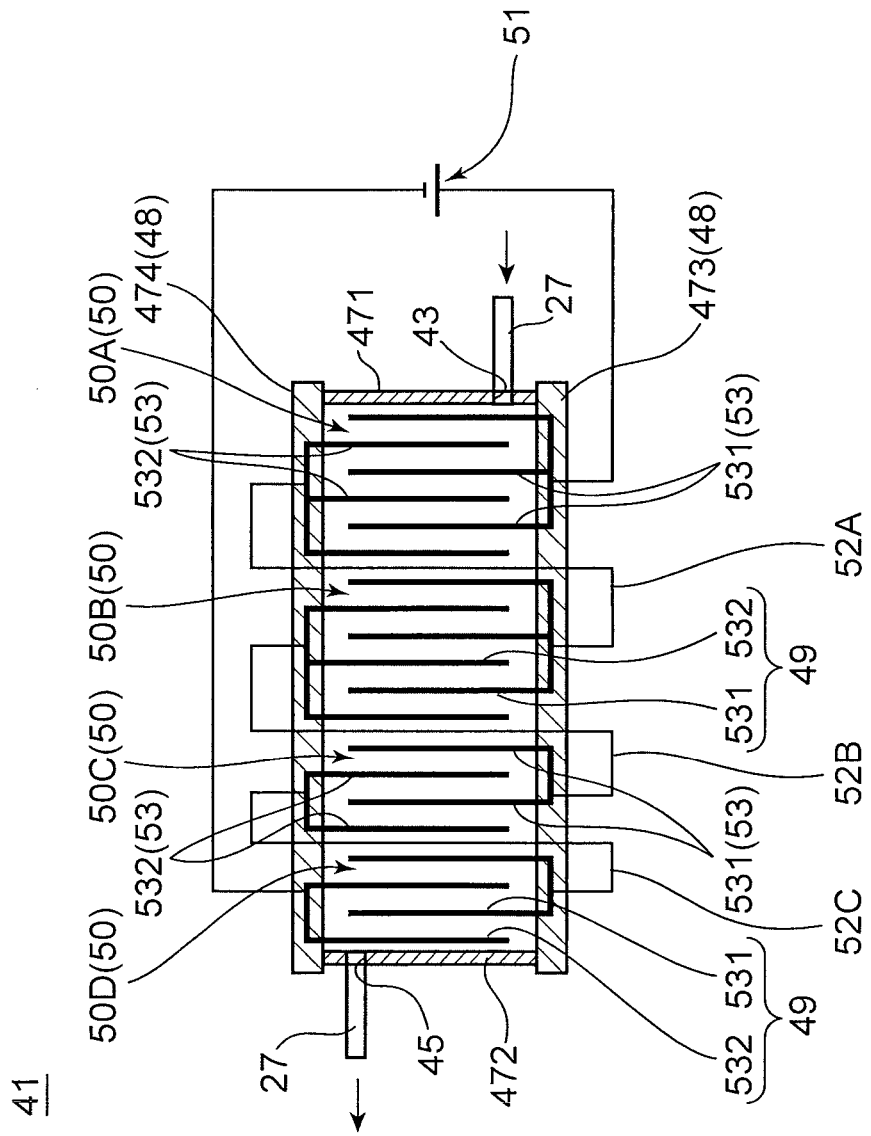
FIG. 5 is a sectional view showing an electrolysis device according to a fourth embodiment of the present invention.

FIG. 5 is a sectional view showing the electrolysis device 41 according to a fourth embodiment of the present invention. The electrolysis device 41 according to the fourth embodiment is different from the electrolysis device 41 according to the second embodiment shown in FIG. 3 in that the four blocks 50A to 50D are connected to the power supply 51 in series. The other components are substantially the same as the components in the second embodiment. Therefore, only main components are explained below.

As shown in FIG. 5, in the electrolysis device 41 according to the fourth embodiment, each of the block 50A and the block 50B includes five electrode pairs 49 configured by six electrode plates 53. The five electrode pairs 49 are connected to the power supply 51 in parallel.

Each of the block 50C and the block 50D arranged on the downstream side than the block 50A and the block 50B includes three electrode pairs 49 configured by four electrode plates 53. The three electrode pairs 49 are connected to the power supply 51 in parallel. The number of the electrode pairs 49 of the block 50C and the block 50D is smaller than the number of the electrode pairs 49 of the block 50A and the block 50B arranged on the upstream side than the block 50C and the block 50D. Spaces among the electrode plates 53 of each of the electrode pairs 49 are substantially the same.

The positive electrode of the power supply 51 is connected to the first electrode plate 531 of the block 50A. The negative electrode of the power supply 51 is connected to the second electrode plate 532 of the block 50D. The second electrode plate 532 of the block 50A and the first electrode plate 531 of the block 50B are connected by a wire 52A. The second electrode plate 532 of the block 50B and the first electrode plate 531 of the block 50C are connected by a wire 52B. The second electrode 532 of the block 50C and the first electrode plate 531 of the block 50D are connected by a wire 52C.

(Fifth Embodiment)

Figure 6:
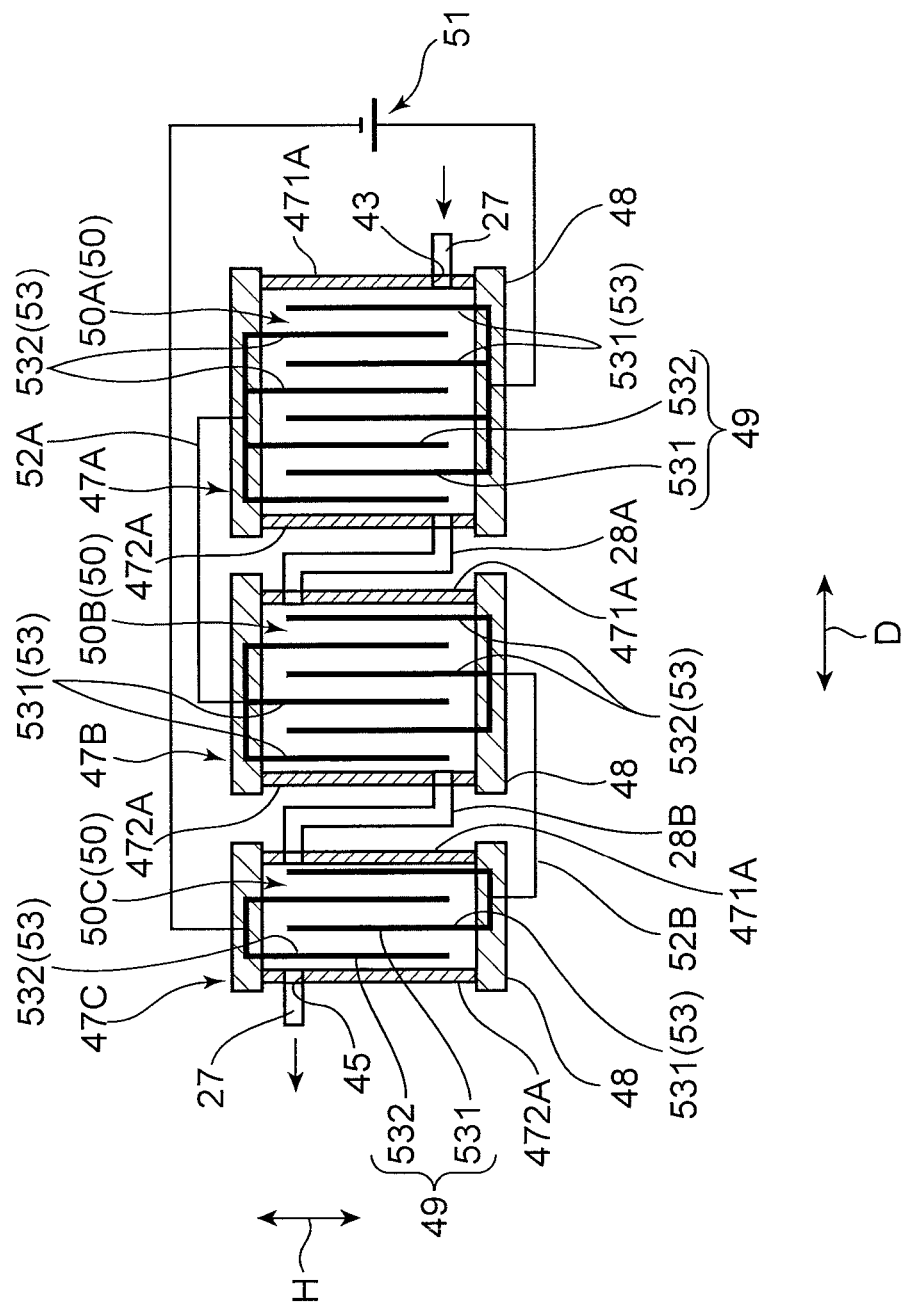
FIG. 6 is a sectional view showing an electrolysis device according to a fifth embodiment of the present invention.

FIG. 6 is a sectional view showing the electrolysis device 41 according to a fifth embodiment of the present invention. In the fifth embodiment, three blocks 50A, 50B, and 50C are connected to the power supply 51 in series. The container 47 includes the first housing 47A, the second housing 47B, and the third housing 47C for housing the blocks 50 and the coupling pipes 28A and 28B. Components of the container 47 are substantially the same as the components in the third embodiment. Therefore, the components are denoted by reference numerals and signs same as the reference numerals and signs in FIG. 4 and explanation of the components is omitted.

As shown in FIG. 6, in the electrolysis device 41 according to the fifth embodiment, the block 50A includes seven electrode pairs 49 configured by eight electrode plates 53. The seven electrode pairs 49 are connected to the power supply 51 in parallel. The block 50B includes five electrode pairs 49 configured by six electrode plates 53. The five electrode pairs 49 are connected to the power supply 51 in parallel. The block 50C includes three electrode pairs 49 configured by four electrode plates 53. The three electrode pairs 49 are connected to the power supply 51 in parallel.

As explained above, the number of the electrode pairs 49 of the block 50C located most downstream is smaller than the number of the electrode pairs 49 of the block 50B located on the upstream side than the block 50C. The number of the electrode pairs 49 of the block 50B is smaller than the number of the electrode pairs 49 of the block 50A located most upstream. Spaces among the electrode plates 53 of each of the electrode pairs 49 are substantially the same.

The positive electrode of the power supply 51 is connected to the first electrode plate 531 of the block 50A. The negative electrode of the power supply 51 is connected to the second electrode plate 532 of the block 50C. The second electrode plate 532 of the block 50A and the first electrode plate 531 of the block 50B are connected by the wire 52A. The second electrode plate 532 of the block SOB and the first electrode plate 531 of the block 50C are connected by the wire 52B.

(Sixth Embodiment)

FIG. 7 is a sectional view showing the electrolysis device 41 according to a sixth embodiment of the present invention. In the sixth embodiment, a distance between the electrode plates 53 adjacent to each other is smaller in the electrode pair 49 further on the downstream side.

In the electrolysis device 41, the plurality of first electrode plates 531 are respectively extended from the proximal end portions located in the vicinity of the third wall 473 toward the fourth wall 474. The proximal end of each of the first electrode plates 531 is coupled to the coupling plate 54 (or the coupling wire 54) extended in the direction substantially parallel to the third wall 473. The coupling plate 54 is connected to the positive electrode of the power supply 51. The first electrode plates 531 are supported in the container 47 by not-shown supporting members.

The plurality of second electrode plates 532 are respectively extended from the proximal end portions located in the vicinity of the fourth wall 474 toward the third wall 473. The proximal end portion of each of the second electrode plates 532 is coupled to the coupling plate 56 (or the coupling wire 56) extended in the direction substantially parallel to the fourth wall 474. The coupling plate 56 is connected to the negative electrode of the power supply 51. The second electrode plates 532 are supported in the container 47 by not-shown supporting members.

The plurality of electrode plates 53 are arrayed in the thickness direction of the electrode plates 53 while being spaced apart from one another. The first electrode plates 531 and the second electrode plates 532 are alternately arranged along the array direction D. Each of the electrode plates 53 is arranged in a posture extending in the direction substantially perpendicular to the array direction D. The array direction D generally coincides with the direction in which the sidewall 48 extends (the longitudinal direction of the container 47).

A distance between the electrode plates of the plurality of electrode pairs 49 gradually decreases from the electrode pair 49 located most upstream to the electrode pair 49 located most downstream. In the electrolysis device 41, in the container 47, electrolyte concentration in the water gradually decreases from a region close to the first flow port 43 to a region close to the second flow port 45. Therefore, in the sixth embodiment, it is possible to finely adjust current density between the electrode plates 53 of each of the electrode pairs 49 by gradually reducing the distance between the electrodes according to the decrease in the electrolyte concentration.

(Seventh Embodiment)

FIG. 8 is a sectional view showing the electrolysis device 41 according to a seventh embodiment of the present invention. The electrolysis device 41 according to the seventh embodiment is different from the electrolysis device 41 according to the third embodiment shown in FIG. 4 in that the three blocks 50A, 50B, and 50C are connected to the power supply 51 in parallel and that a distance between electrodes is smaller in the block 50 further on the downstream side. The other components are substantially the same as the components in the third embodiment. Therefore, only main components are explained below.

As shown in FIG. 8, in the electrolysis device 41 according to the seventh embodiment, each of the blocks 50 includes seven electrode pairs 49 configured by eight electrode plates 53. The seven electrode pairs 49 are connected to the power supply 51 in series. The positive electrode of the power supply 51 is connected to the first electrode plates 531 of each of the blocks 50. The negative electrode of the power supply 51 is connected to the second electrode plate 532 of each of the blocks 50.

A distance between electrodes in each of the electrode pairs 49 of the block 50C located most downstream is smaller than a distance between electrodes in each of the electrode pairs 49 of the block 50B located on the upstream side than the block 50C. The distance between the electrodes in each of the electrode pairs 49 of the block 50B is smaller than a distance between electrodes in each of the electrode pairs 49 of the block 50A located on the upstream side than the block 50B. Distances between electrodes of the seven electrode pairs 49 of the block 50A are substantially the same. Distances between electrodes of the seven electrode pairs 49 of the block 50B are substantially the same. Similarly, distances between electrodes of the seven electrode pairs 49 of the block 50C are substantially the same.

(Eighth Embodiment)

FIG. 9 is a sectional view showing the electrolysis device 41 according to an eighth embodiment of the present invention. The electrolysis device 41 according to the eighth embodiment is different from the electrolysis device 41 according to the seventh embodiment in that the number of the electrode pairs 49 is larger in the block 50 further on the downstream side. The other components are substantially the same as the components in the seventh embodiment. Therefore, only main components are explained below.

As shown in FIG. 9, in the eighth embodiment, as in the seventh embodiment, the three blocks 50A, 50B, and 50C are connected to the power supply 51 in parallel. A distance between electrodes is smaller in the block 50 further on the downstream side.

In the electrolysis device 41 according to the eighth embodiment, the block 50A includes seven electrode pairs 49 configured by eight electrode plates 53. The seven electrode pairs 49 are connected to the power supply 51 in parallel. The block 50B includes nine electrode pairs 49 configured by ten electrode plates 53. The nine electrode pairs 49 are connected to the power supply 51 in parallel. The block 50C includes eleven electrode pairs 49 configured by twelve electrode plates 53. The eleven electrode pairs 49 are connected to the power supply 51 in parallel.

As the number of the electrode pairs 49 of each of the blocks 50 is larger, current density per one electrode pair 49 is smaller. However, in the eighth embodiment, a decrease in current density due to an increase in the number of the electrode pairs 49 is supplemented by reducing a distance between electrodes of the electrode pairs 49 in the block 50 further on the downstream side. A contact area between the electrode plates 53 and the water is increased by increasing the number of the electrode pairs 49 in the block 50 further on the downstream side in which the distance between the electrodes is smaller. A space in each of the containers 47 is effectively utilized by increasing the number of the electrode pairs 49 in the block 50 further on the downstream side in which the distance between the electrodes is smaller.

As explained above, in the embodiments, the current density of the second electrode pair 49 is adjusted so as to suppress a decrease in current density in the second electrode pair 49 arranged on the downstream side where electrolyte concentration is lower than electrolyte concentration on the upstream side. Consequently, it is possible to effectively remove scale components in the second electrode pair 49 arranged on the downstream side where the electrolyte concentration is low. Therefore, it is possible to improve removal efficiency for scale components in the electrolysis device. When the current density of the second electrode pair 49 is adjusted and the removal efficiency for scale components is improved as explained above, it is possible to efficiently remove scale components not only in the first electrode pair 49 but also in the second electrode pair 49. Therefore, it is also possible to suppress total power consumption.

In the first to fifth embodiments, the current density of the second electrode pair 49 is adjusted by setting the voltage applied to the second electrode pair 49 larger than the voltage applied to the first electrode pair 49. Consequently, it is possible to suppress a decrease in current density in the second electrode pair 49 arranged on the downstream side where electrolyte concentration in the water is lower than electrolyte concentration on the upstream side.

In the sixth to eighth embodiments, the current density of the second electrode pair 49 is adjusted by setting the distance between the electrodes 53 configuring the second electrode pair 49 smaller than the distance between the electrodes 53 configuring the first electrode pair 49. The distance between the electrodes 53 of the electrode pair 49 is related to electric resistance. The current density can be increased by reducing the distance between the electrodes 53. Therefore, in this configuration, simply by adjusting the distances between the electrodes 53, it is possible to suppress a decrease in current density in the second electrode pair 49 arranged on the downstream side where the electrolyte concentration in the water is lower than the electrolyte concentration on the upstream side. Therefore, it is possible to simplify the structure of the electrolysis device 41 and reduce the size of the electrolysis device 41.

In the embodiments other than the sixth embodiment, the upstream side block 50 in which the plurality of first electrode pairs 49 are connected in parallel, and the downstream side block 50 in which the plurality of second electrode pairs 49 are connected in parallel and which is arranged on the downstream side than the upstream side block 50, are provided in the container 47. In this configuration, it is possible to adjust current density for each of the blocks 50.

In the second, fourth, and fifth embodiments, the number of the electrode pairs 49 configuring the downstream side block 50 is smaller than the number of the electrode pairs 49 configuring the upstream side block 50. Consequently, compared with the case in which the numbers of the electrode pairs 49 of the upstream side block 50 and the downstream side block 50 are the same, current density per one electrode pair 49 in the downstream side block 50 is large.

In the fourth and fifth embodiments, the number of the electrode pairs 49 configuring the downstream side block 50 is smaller than the number of the electrode pairs 49 configuring the upstream side block 50. Moreover, the upstream side block 50 and the downstream side block 50 are connected to each other in series. In this configuration, compared with the case in which the numbers of the electrode pairs 49 of the upstream side block 50 and the downstream side block 50 are the same, current density per one electrode pair 49 in the downstream side block 50 is large. Moreover, since the upstream side block 50 and the downstream side block 50 are connected in series, for example, it is unnecessary to prepare a plurality of power supplies in order to change an applied voltage for each of the blocks. Therefore, it is possible to simplify the structure of the electrolysis device 41 and reduce the size of the electrolysis device 41.

In the third, fifth, seventh, and eighth embodiments, the container 47 includes the first housing 47A for housing the upstream side block 50 and the second housing 47B for housing the downstream side block 50. The configuration for housing the electrode pairs 49 in a separate housing for each of the blocks 50 has an advantage in terms of manufacturing, for example, simplification of manufacturing processes.

In the embodiments, each of the electrode pairs 49 is configured by a pair of plate-like electrodes 53. The plurality of electrode pairs 49 are arrayed in the thickness direction of the electrodes 53. In this configuration, it is possible to increase the contact area between the electrodes 53 and the water while reducing a volume occupied by the plurality of electrode pairs 49 by arraying the plurality of electrode pairs 49 in the thickness direction of the electrodes 53. Therefore, it is possible to improve the removal efficiency for scale components.

In the embodiments: in the heat-pump-type water heater 11, the electrolysis device 41 is provided in the feed channel 27. In the feed channel 27, the flow velocity of water is low and fluctuation in the flow velocity is small. Therefore, the flow velocity of water passing through the electrolysis device 41 is generally fixed at a low flow velocity. Consequently, in the electrolysis device 41, it is possible to stably obtain an effective removal effect for scale components. Since electrolysis is performed during the operation of the heat pump, it is possible to use night-time electric power and reduce electricity charges.

In the specific embodiments explained above, inventions including configurations explained below are mainly included.

The electrolysis device according to the present invention is used in a water heater including a water heat exchanger for heating water. The electrolysis device includes a container including an inlet and an outlet for water, a first electrode pair and a second electrode pair disposed in the container, and a power supply that applies a voltage to each of the electrode pairs. The electrolysis device is configured such that water flowing into the container from the inlet flows from an upstream side to a downstream side in the container and flows out from the outlet. The first electrode pair is arranged on the upstream side than the second electrode pair. In the electrolysis device, in order to suppress a decrease in current density due to electrolyte concentration in the water in the second electrode pair arranged on the downstream side than the first electrode pair, the current density in the second electrode pair is adjusted.

In a process in which the water flows from the upstream side to the downstream side in the container of the electrolysis device, since scale components contained in the water are gradually removed, the concentration of an electrolyte is lower in a region on the downstream side than in a region on the upstream side. Therefore, in this configuration, the current density of the second electrode pair is adjusted in order to suppress a decrease in current density in the second electrode pair arranged on the downstream side where the electrolyte concentration in the water is lower than the electrolyte concentration on the upstream side. Consequently, it is possible to effectively remove scale components in the second electrode pair arranged on the downstream side where the electrolyte concentration is low. Therefore, it is possible to improve removal efficiency for scale components in the electrolysis device. When the current density of the second electrode pair is adjusted and the removal efficiency for scale components is improved, it is possible to efficiently remove scale components not only in the first electrode pair but also in the second electrode pair. Therefore, it is possible to suppress total power consumption.

In the electrolysis device, it is possible to adjust the current density of the second electrode pair by, for example, setting a voltage applied to the second electrode pair larger than a voltage applied to the first electrode pair. Consequently, it is possible to suppress a decrease in current density in the second electrode pair arranged on the downstream side where the electrolyte concentration in the water is lower than the electrolyte concentration on the upstream side.

In the electrolysis device, the current density of the second electrode pair may be adjusted by, for example, setting a distance between electrodes configuring the second electrode pair smaller than a distance between electrodes configuring the first electrode pair. The distance between the electrodes of the electrode pair is related to electric resistance. The current density between the electrodes can be increased by reducing the distance between the electrodes. Therefore, in this configuration, simply by adjusting the distances between the electrodes, it is possible to suppress a decrease in current density in the second electrode pair arranged on the downstream side where the electrolyte concentration in the water is lower than the electrolyte concentration on the upstream side. Therefore, it is possible to simplify the structure of the electrolysis device and reduce the size of the electrolysis device.

In the electrolysis device, it is preferable that, an upstream side block in which a plurality of the first electrode pairs are connected in parallel, and a downstream side block in which a plurality of the second electrode pairs are connected in parallel and which is arranged on the downstream side than the upstream side block, are provided in the container. In this configuration, it is possible to adjust current density for each of the blocks.

In the electrolysis device, the number of the electrode pairs configuring the downstream side block may be smaller than the number of the electrode pairs configuring the upstream side block. Consequently, compared with the case in which the numbers of the electrode pairs of the upstream side block and the downstream side block are the same, current density per one electrode pair in the downstream side block is large.

When the number of the electrode pairs configuring the downstream side block is smaller than the number of the electrode pairs configuring the upstream side block, it is preferable that the upstream side block and the downstream side block are connected in series. In this configuration, compared with the case in which the numbers of the electrode pairs of the upstream side block and the downstream side block are the same, current density per one electrode pair in the downstream side block is large. Moreover, since the upstream side block and the downstream side block are connected in series, for example, it is unnecessary to prepare a plurality of power supplies in order to change an applied voltage for each of the blocks. Therefore, it is possible to simplify the structure of the electrolysis device and reduce the size of the electrolysis device.

In the electrolysis device, the container may include a first housing for housing the upstream side block and a second housing for housing the downstream side block. The configuration for housing the electrode pairs in a separate housing for each of the blocks has an advantage in terms of manufacturing, for example, simplification of manufacturing processes.

In the electrolysis device, it is preferable that each of the electrode pairs is configured by a pair of plate-like electrodes and the plurality of electrode pairs are arrayed in the thickness direction of the electrodes. In this configuration, it is possible to increase a contact area between the electrodes and the water while reducing a volume occupied by the plurality of electrode pairs by arraying the plurality of electrode pairs in the thickness direction of the electrodes. Therefore, it is possible to improve the removal efficiency for scale components.

A heat-pump-type water heater according to the present invention includes a heat pump unit which includes a water heat exchanger for heating water, and in which a refrigerant circulates through a refrigerant pipe, a hot water storage unit including a tank in which the water is stored, a feed channel for feeding the water in the tank to the water heat exchanger, and a return channel for returning the water heated by the water heat exchanger to the tank, a water supply pipe for supplying the water from a water supply source to the tank, and a hot water supply pipe for supplying high-temperature water stored in the tank, and the electrolysis device for removing scale components contained in the water. In this configuration, since the heat-pump-type water heater includes the electrolysis device, it is possible to efficiently remove scale components in the water in the heat-pump-type water heater.

In the heat-pump-type water heater, it is preferable that the electrolysis device is provided in the feed channel. Since the flow velocity of the water is low in the feed channel and fluctuation in the flow velocity is small, the flow velocity of water passing through the electrolysis device is generally fixed at a low flow velocity. Consequently, in the electrolysis device, it is possible to stably obtain an effective removal effect for scale components. Since electrolysis is performed during the operation of the heat pump, it is possible to use night-time electric power and reduce electricity charges.

The present invention is not limited to the embodiments. Various modifications, improvements, and the like are possible without departing from the spirit of the present invention. For example, in the example explained in the embodiments, as shown in FIG. 1, the electrolysis device 41 is provided in the inflow water pipe 27 on the downstream side than the pump 31 in the water heater 11. However, the present invention is not limited to this. The electrolysis device 41 may be provided in the inflow water pipe 27 on the upstream side than the pump 31 or may be provided in the water supply pipe 37 for supplying the water from the water supply source to the tank 15.

Each of the electrode plates may be formed in a mesh shape in which a plurality of small through-holes are formed or may be a bar shape. When the electrode plate has the bar shape, a shorter one of dimensions in two directions orthogonal on a cross section perpendicular to the longitudinal direction of the electrode plate is set as thickness and a longer one of the dimensions is set as width.

In the explanation explained in the embodiments, the container 47 has the substantially rectangular parallelepiped shape. However, the present invention is not limited to this. The container 47 may be a prism shape other than a rectangular parallelepiped or may be a columnar shape.

In the form illustrated in the embodiment, the first flow port is provided in the first wall and the second flow port is provided in the second wall. However, the present invention is not limited to this. The first flow port 43 may be provided in the vicinity of the first wall 471 and the second flow port 45 may be provided in the vicinity of the second wall 472. Specifically, for example, the first flow port 43 may be provided in the third wall 473 in the vicinity of the first wall 471 and the second flow port 45 may be provided in the fourth wall 474 in the vicinity of the second wall 472.

In the embodiments other than the sixth embodiment, the form was exemplified in which there are provided the upstream side block 50 in which the plurality of first electrode pairs 49 are connected in parallel, and the downstream side block 50 in which the plurality of second electrode pairs 49 are connected in parallel and which is arranged on the downstream side than the upstream side block 5. However, the present invention is not limited to this. For example, as in the sixth embodiment shown in FIG. 7, the plurality of electrode pairs 49 do not have to be divided into a plurality of blocks.

In the embodiments, the one-through type water heater is explained as the example. However, the present invention is not limited to this.

EXPLANATION OF REFERENCE NUMERALS 11 water heater
13 heat pump unit
15 tank
17 hot water storage unit
21 water heat exchanger
27 inflow water pipe (an example of a feed channel)
29 outflow hot water pipe (an example of a return channel)
31 pump
35 hot water supply pipe
37 water supply pipe
41 electrolysis device
43 first flow port
45 second flow port
47 container
49 electrode pairs
50 blocks
51 power supplies
53 electrode plates
531 first electrode plates
532 second electrode plates
D array direction of a plurality of electrode plates

The invention claimed is:

1. An electrolysis device used in a water heater including a water heat exchanger for heating water, the electrolysis device comprising:
   a container including an inlet and an outlet for water;
   a first electrode pair including a first electrode and a second electrode disposed in the container, the first electrode being positioned a first distance from the second electrode;
   a second electrode pair including a third electrode and a fourth electrode disposed in the container, the third electrode being positioned a second distance from the fourth electrode; and
   a power supply that applies a voltage to each of the electrode pairs, wherein
   the electrolysis device is configured such that water flowing into the container from the inlet flows from an upstream side to a downstream side in the container and flows out from the outlet,
   the first electrode pair is arranged on the upstream side than the second electrode pair,
   in order to suppress a decrease in current density due to electrolyte concentration in the water in the second electrode pair arranged on the downstream side than the first electrode pair, the current density in the second electrode pair is adjusted,
   the first electrode pair and the second electrode pair are independent from each other, and
   the second distance between the electrodes of the second electrode pair is smaller than the first distance between the electrodes of the first electrode pair.

2. The electrolysis device according to claim 1, wherein a voltage applied to the second electrode pair is larger than a voltage applied to the first electrode pair.

3. The electrolysis device according to claim 1, wherein an upstream side block in which a plurality of the first electrode pairs are connected in parallel, and a downstream side block in which a plurality of the second electrode pairs are connected in parallel and which is arranged on the downstream side than the upstream side block, are provided in the container.

4. The electrolysis device according to claim 3, wherein the number of the electrode pairs configuring the downstream side block is smaller than the number of the electrode pairs configuring the upstream side block.

5. The electrolysis device according to claim 4, wherein the upstream side block and the downstream side block are connected in series.

6. The electrolysis device according to claim 3, wherein the container includes a first housing for housing the upstream side block and a second housing for housing the downstream side block.

7. The electrolysis device according to claim 1, wherein each of the electrode pairs is configured by a pair of plate-like electrodes, and the plurality of electrode pairs are arrayed in a thickness direction of the electrodes.

8. A heat-pump-type water heater comprising:
   a heat pump unit which includes a water heat exchanger for heating water, and in which a refrigerant circulates through a refrigerant pipe;
   a hot water storage unit including a tank in which the water is stored, a feed channel for feeding the water in the tank to the water heat exchanger, and a return channel for returning the water heated by the water heat exchanger to the tank;
   a water supply pipe for supplying the water from a water supply source to the tank;
   a hot water supply pipe for supplying high-temperature water stored in the tank; and
   the electrolysis device according to claim 1 for removing scale components contained in the water.

9. The heat-pump-type water heater according to claim 8, wherein the electrolysis device is provided in the feed channel.

* * * * *